United States Patent
Temple (10) Patent No.: US 7,294,222 B2
(45) Date of Patent: Nov. 13, 2007

(54) EXTERNAL PIPE CLEANER

(75) Inventor: William James Temple, Fort Collins, CO (US)

(73) Assignee: P E Fusion, LLC, Fort Collins, CO (US)

(*) Notice: Subject to any disclaimer, the term of this patent is extended or adjusted under 35 U.S.C. 154(b) by 154 days.

(21) Appl. No.: 10/808,690

(22) Filed: Mar. 25, 2004

(65) Prior Publication Data

US 2004/0188013 A1    Sep. 30, 2004

Related U.S. Application Data

(60) Provisional application No. 60/459,006, filed on Mar. 26, 2003.

(51) Int. Cl.
- B29C 65/00    (2006.01)
- B32B 38/10    (2006.01)
- B08B 9/023    (2006.01)

(52) U.S. Cl. .............. 156/281; 156/304.2; 156/509; 156/535; 15/88; 15/104.03; 15/104.068

(58) Field of Classification Search ........... 156/281, 156/535, 304.2, 509; 15/88, 104.03, 104.068, 15/104.16

See application file for complete search history.

(56) References Cited

U.S. PATENT DOCUMENTS

| | | | |
|---|---|---|---|
| 388,794 A * | 8/1888 | Smith .................. | 15/104.068 |
| 894,857 A * | 8/1908 | Rogers ................. | 15/104.16 |
| 981,417 A * | 1/1911 | Halsey et al. .......... | 451/180 |
| 1,000,737 A * | 8/1911 | MacLennan ............. | 277/526 |
| 3,805,311 A * | 4/1974 | Brandt ................. | 15/104.16 |
| 3,885,521 A * | 5/1975 | von Arx ................ | 118/105 |
| 4,011,617 A * | 3/1977 | Toelke et al. .......... | 15/88 |
| 4,205,407 A * | 6/1980 | King et al. ............ | 15/88 |
| 4,220,481 A * | 9/1980 | Bleiman et al. ......... | 134/6 |
| 4,308,630 A * | 1/1982 | Schmidt ................ | 15/88.3 |
| 4,503,577 A * | 3/1985 | Fowler ................. | 15/88 |
| 4,798,246 A * | 1/1989 | Best ................... | 166/311 |
| 4,895,205 A * | 1/1990 | Thompson et al. ........ | 166/90.1 |
| 4,982,787 A * | 1/1991 | Reddoch ................ | 166/84.1 |
| 4,984,322 A * | 1/1991 | Cho et al. ............. | 15/104.061 |
| 5,091,034 A * | 2/1992 | Hubert ................. | 156/344 |
| 5,136,969 A * | 8/1992 | Chapman ................ | 118/305 |
| 5,505,898 A * | 4/1996 | Goto et al. ............ | 264/275 |
| 5,600,862 A * | 2/1997 | Bleske et al. .......... | 15/104.04 |
| 6,153,016 A * | 11/2000 | Rauch et al. ........... | 134/6 |
| 6,553,601 B1 * | 4/2003 | Major .................. | 15/104.04 |
| 6,990,707 B1 * | 1/2006 | Heumann et al. ......... | 15/302 |

* cited by examiner

Primary Examiner—Mark A Osele
(74) Attorney, Agent, or Firm—Dinsmore & Shohl, LLP; Monika J. Hussell (57) ABSTRACT

Disclosed is a pipe cleaner apparatus that is attached to a pipe fusion machine. The pipe cleaner removes dirt, snow, mud, and other debris from the outer surface of pipe sections prior to the butt fusion process. The pipe cleaner may be a wiper through which the pipe slides, or may be a multi-piece scraper with spring loaded flaps that clean the outside surface of the pipe.

12 Claims, 7 Drawing Sheets

EXTERNAL PIPE CLEANER

CROSS REFERENCE TO RELATED APPLICATIONS

The present application is based upon and claims the benefit of U.S. Provisional Patent Application Ser. No. 60/459,006 by William James Temple entitled "External Pipe Cleaner" filed Mar. 26, 2003, the entire contents of which is hereby specifically incorporated by reference for all it discloses and teaches.

BACKGROUND OF THE INVENTION

The present invention pertains generally to the fusion of plastic pipe and specifically to the external cleaning of the pipe prior to fusion.

Polyethylene pipe is used commercially for the construction of pipelines for various applications such as natural gas, water, sewer, and other materials. In addition, polyethylene pipe may be used as conduit to protect transmission cables such as high voltage electricity, fiber optic telecommunication, telephone, cable television, and other signal cables.

Polyethylene pipe is typically joined through a process called fusion welding, the most common joint being a butt joint. A butt joint is formed by holding the two sections of pipe rigidly, performing a facing operation to square the ends of the pipes and prepare the pipes for welding, then heating the prepared faces of the pipes on a hot plate to the melting point, removing the heating element, and forcing the two melted faces together. The resulting joint may be cooled before being subjected to any handling forces. The result is a fused joint that is as strong or stronger than the parent material and is very reliable.

U.S. Pat. No. 4,990,209 issued to George Rakes entitled "Self Propelled Fusion Machine" (Rakes) is a machine adapted to perform butt joints on polyethylene pipe as described above. Rakes is incorporated herein by reference for all that it discloses and teaches. The Rakes machine performs the sequence of butt fusing in a semi automated fashion, with provisions for easily loading and unloading the pipe as it is welded. Additionally, the Rakes device performs the butt fusion process in an enclosed environment, adding to the consistency and speed to a pipeline construction.

When machines such as the Rakes device are used in the field, often rain, snow, mud and other debris may be present on the outside of the pipe. As the sections of pipe are handled and loaded into the machine for fusion, the debris should be removed, causing extra time to be taken to clean the pipes beforehand or to clean the equipment afterwards.

It would therefore be advantageous to provide a device and method of cleaning pipe sections prior to welding. It would be further advantageous if the method did not require any extra work on the part of any workers constructing a pipeline.

SUMMARY OF THE INVENTION

The present invention overcomes the disadvantages and limitations of the prior art by providing a simple, effective device for cleaning off snow, dirt, mud, and other debris before a pipe enters a fusion machine. The cleaning device may be located outside the enclosed portion of a fusion machine so equipped, or may be located before the actual mechanism that performs the fusion welds.

The present invention may therefore comprise a pipe fusion machine comprising: a fusing mechanism for fusing sections of pipe to form a pipeline, and a cleaning mechanism for cleaning debris from the external surface of the sections of pipe, the cleaning mechanism being mounted on the infeed side of the fusing mechanism.

The present invention may further comprise a pipe cleaner attached to a pipe fusion machine comprising: a flexible wiper, the wiper being substantially planar; and a retainer, the retainer being adapted to hold the wiper such that the wiper may move normal to the pipe axis.

The present invention may further comprise a pipe cleaner attached to a pipe fusion machine comprising: a mounting frame; and a plurality of wipers, the wipers being spring loaded toward the axis of the pipe and further being adapted to clean debris from the external surface of the pipe.

The advantages of the present invention are the increased efficiency and operation of pipeline construction by cleaning the outer surface of the pipes prior to welding or traversing through the fusion equipment. Because less snow, mud, and other debris is allowed into the equipment, maintenance is reduced and the normal operation can continue without having to stop the machine for cleaning and service.

DETAILED DESCRIPTION OF THE INVENTION

Figure 1:
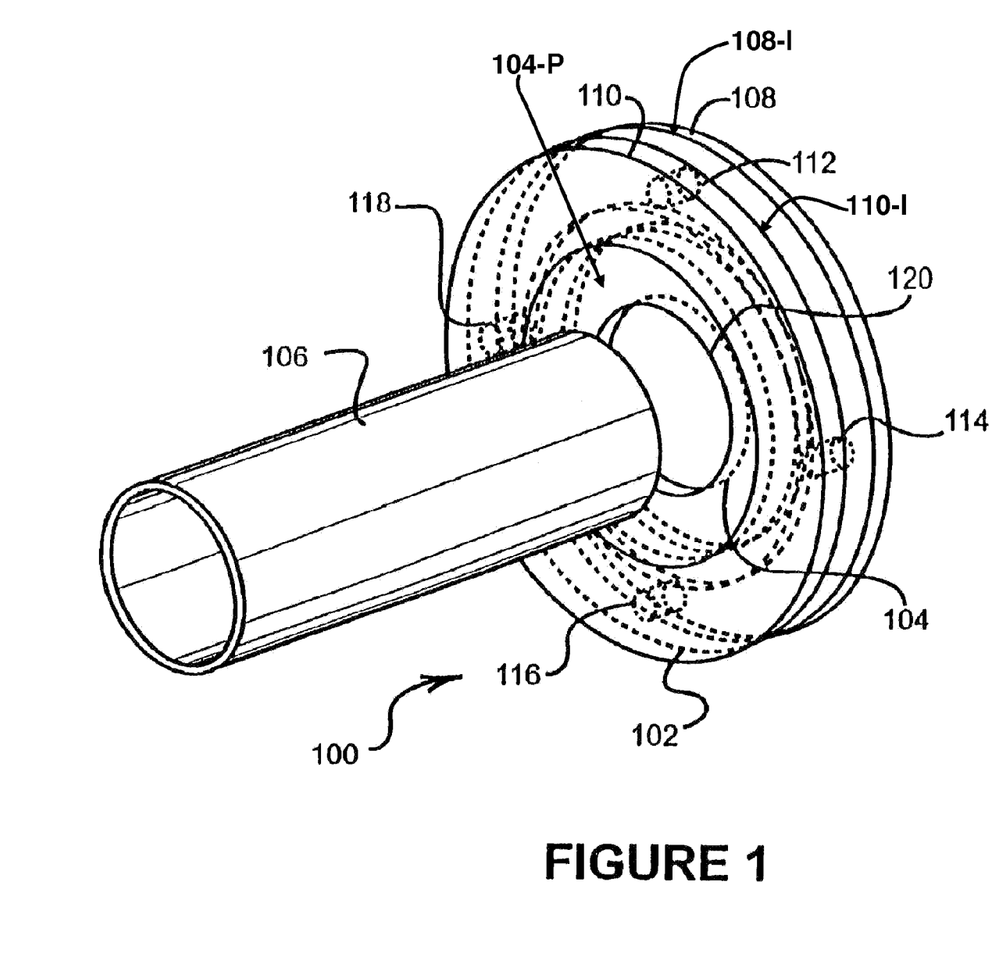
FIG. 1 is an illustration of an embodiment of a pipe cleaning device shown separately from the machine on which it is installed.

FIG. 1 illustrates an embodiment 100 of a pipe cleaning device shown separately from the machine on which it is installed. A retaining mechanism 102 entraps a flexible discus wiper 104 having planar surfaces 104-P. As shown in FIG. 1, the flexible discus wiper 104 comprises a disk having an aperture therethrough, the circumference of the aperture being defined by the inside edge of the disk. A section of pipe 106 is shown approaching the piper cleaner. Generally, the pipe sections 106 being fused by the pipe fusion machine, described in greater detail below, have corresponding diameters, wherein the diameter of the aperture of the flexible discus wiper 104 is slightly less than the corresponding diameters of the pipe sections 106 such that, as the pipe sections 106 pass through the retaining mechanism 102, the outer surface of each pipe section 106 is cleaned of debris by the wiper 104.

The retaining mechanism 102 is composed of a first discus plate 108 and a second discus plate 110, each having, with respect to the retaining mechanism 102, an interior surface and an exterior surface. As shown in the FIGS., it is to be understood that the term "discus" when used herein means resembling a flat circular plate. These first and second discus plates 108, 110 typically are fabricated from steel, although other suitable materials may be used. The interior and exterior surfaces of the first and second discus plates 108, 110 and the lanar surfaces of the flexible discus wiper 104 are in a parallel configuration, with the wiper 104 between the interior surface of the first discus plate 108 and the interior surface of the second discus plate 110. Four independent spacers 112, 114, 116, and 118 separate the two plates 108 and 110. One or more of the spacers may be removable to replace the wiper 104. More particularly, a plurality of independent spacers 112, 114, 116, and 118 are affixed to the respective interior surfaces of the first and second discus plates 108, 110, wherein the spacers connect and separate the two discus plates 108, 110 and are sized and positioned to allow the flexible discus wiper 104 to be held between the respective interior surfaces of the two plates 108, 110.

The wiper 104 is held in the retaining mechanism 102 loosely, such that the wiper may shift along its plane to compensate for any misalignment between the retaining mechanism 102 and with the center axis of the pipe 106. Further, the wiper 104 may be made of a flexible material such as rubber sheet. The thickness of the wiper 104 may be selected to be stiff enough to prevent the wiper 104 from being pulled out of the retainer 102 during use.

The wiper 104 cleans the exterior of the pipe 106 by the inside edge 120 sliding along the outer surface of the pipe 106. The diameter of the inside edge 120 is selected to very closely match the exterior diameter of the pipe 106. In some embodiments, the diameter of the inside edge 120 may be slightly less than the exterior diameter of the pipe 106, and in some embodiments slightly more.

Figure 2:
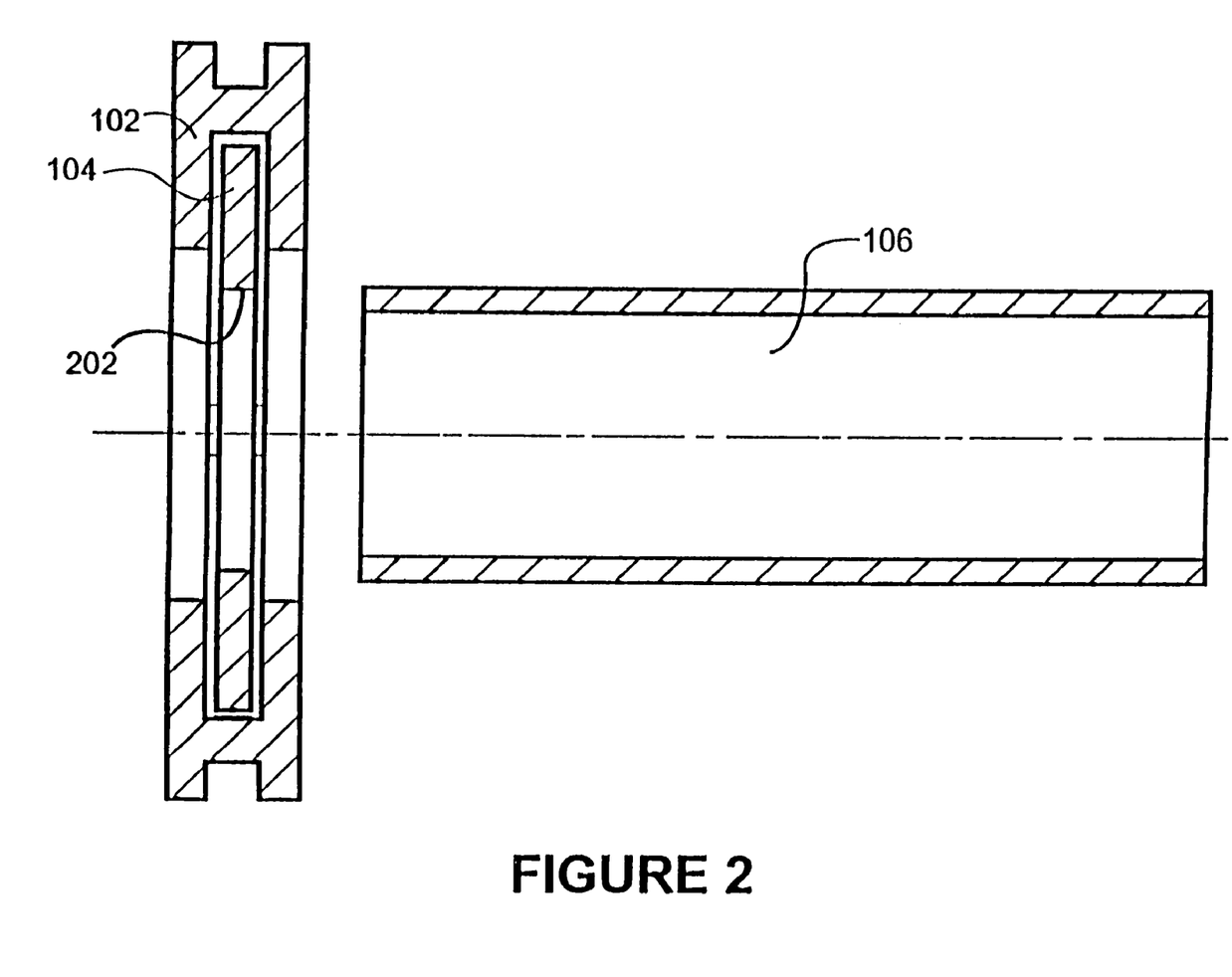
FIG. 2 illustrates a cross section view of the embodiment of a pipe cleaning device of FIG. 1.

FIG. 2 illustrates a cross section view of the embodiment 100 of a pipe cleaning device. The retainer 102 is holding a wiper 104 and the pipe 106 is shown prior to entering the device.

The wiper 104 is contained but not rigidly constrained in the retainer 102. A gap around the outer perimeter of the wiper 104 affords movement by the wiper 104 during use.

Figure 3:
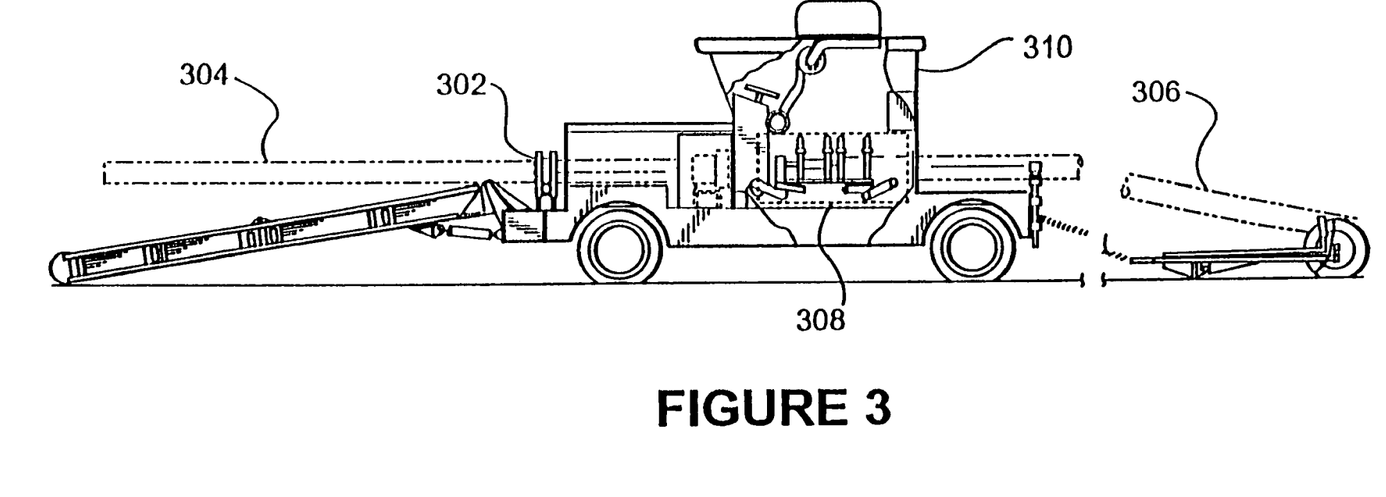
FIG. 3 shows a partial cutaway elevation of Rake's machine with a pipe cleaner installed.
Figure 4:
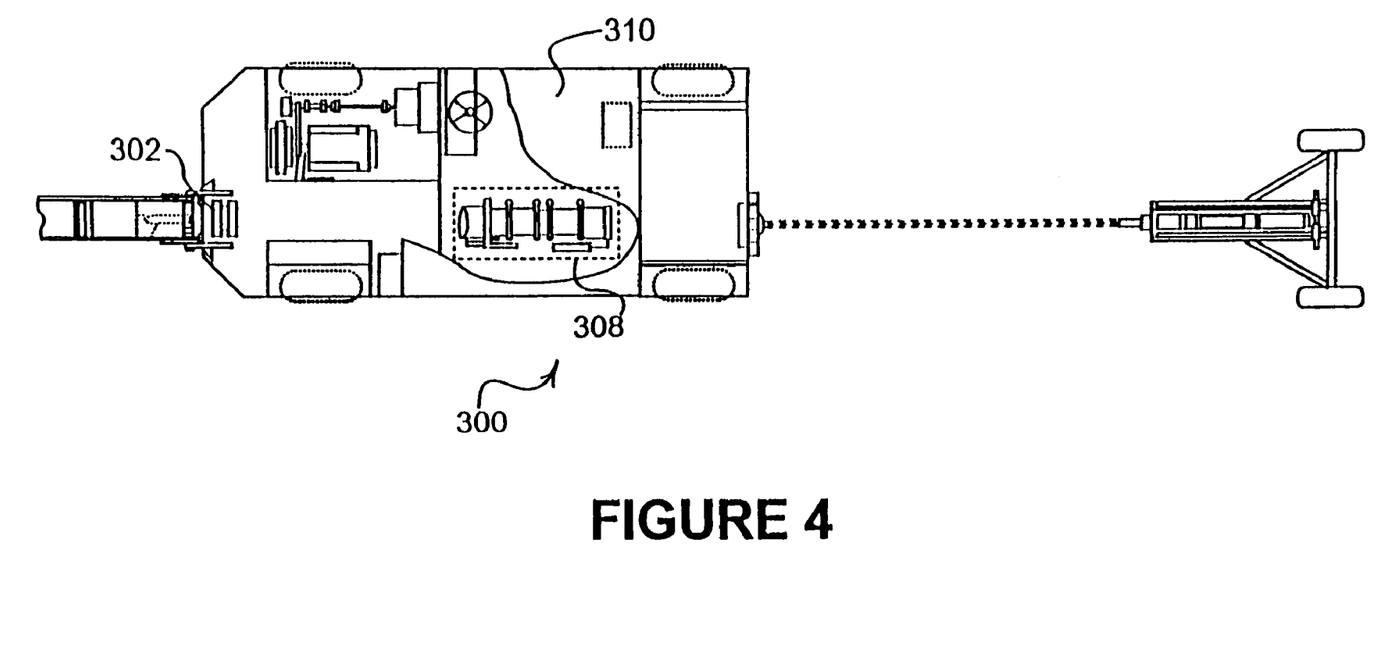
FIG. 4 shows a partial cutaway plan view of Rake's machine of FIG. 3 with a pipe cleaner installed.

The inner face 202 of wiper 104 may be square as shown or may have different profiles. A beveled profile or a flanged profile may be used to more effectively wipe the outer surface of the pipe 106. Various shapes may be used to effectively clean the pipe 106 while still maintaining within the spirit and intent of the present invention. FIG. 3 shows a partial cutaway elevation of Rake's machine 300 with the pipe cleaner 302 of the present invention installed. FIG. 4 shows a partial cutaway plan view of Rake's machine 300. Rake's machine 300 accepts a pipe segment 304 and fuses the segment 304 to the previously joined pipe 306. The fusing apparatus 308 is located in the enclosure 310, providing an isolated environment from the outside weather.

The pipe cleaner 302 is mounted on the entry side of the machine 300, such that debris and such may be cleaned from the outside of the pipe prior to entering the enclosure 310. In some embodiments, the pipe cleaner 302 may be mounted close to the fusing apparatus 308 inside the enclosure 310.

As sections of pipe are loaded into the machine 300, the laborer will place the pipe inside the cleaner 302 and force the pipe through the cleaner and into the machine 300. In some embodiments, a powered roller will assist the laborer in forcing the pipe through the cleaner 302. The cleaner 302 may have facilities to disperse the mud, snow, dirt, and other debris onto the ground and out of the way of other operations.

Figure 5:
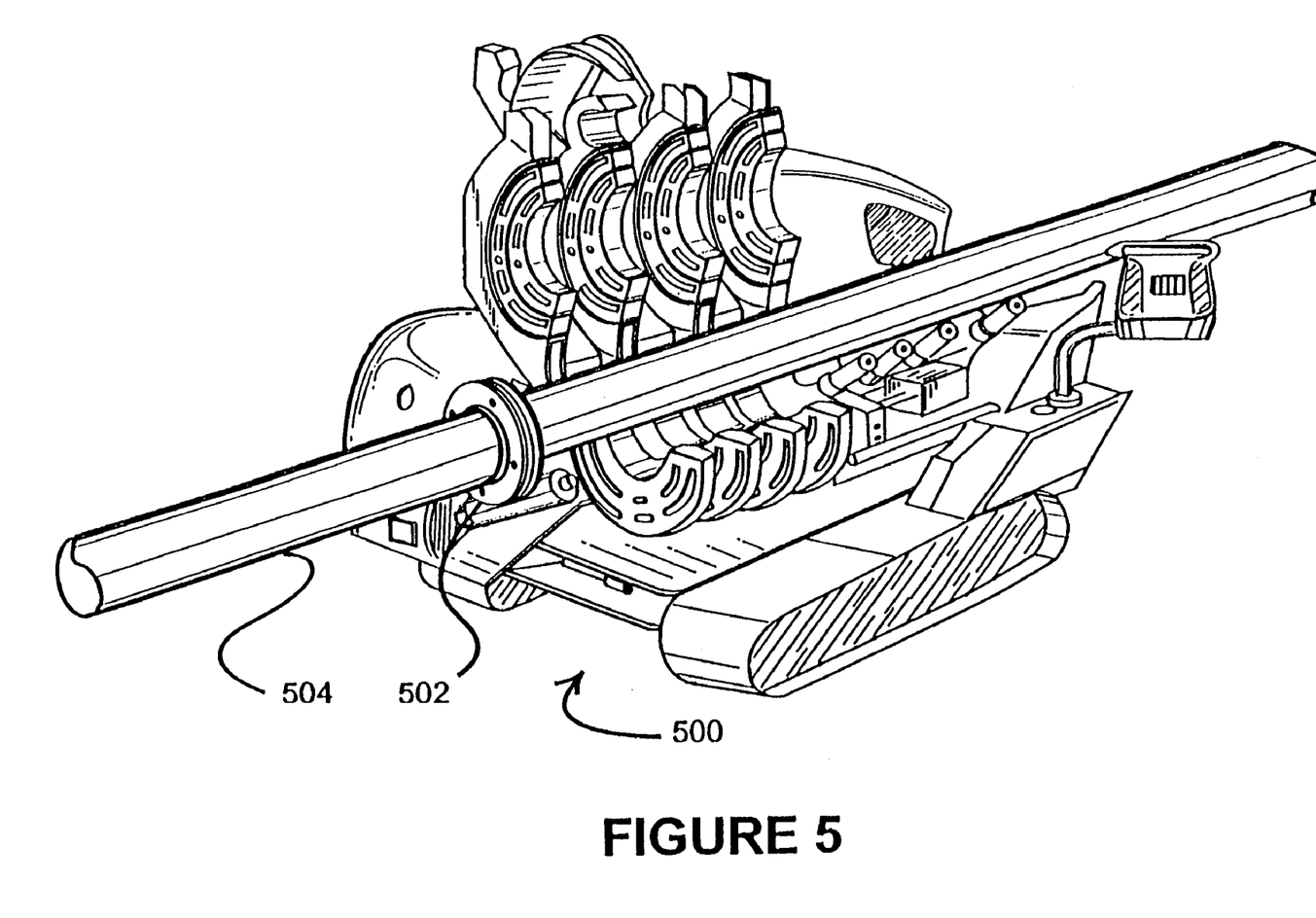
FIG. 5 illustrates a McElroy machine with a pipe cleaner installed.

FIG. 5 illustrates a machine 500 with a pipe cleaner 502 installed. The machine 500 is a McElroy TracStar Model 500 fusion welding machine. The machine 500 moves forward from right to left, traversing to the next weld point. The pipe cleaner 502 of the present invention is installed on the front roller support and ensures that pipe 504 is cleaned prior to moving through the machine. Snow, ice, dirt, mud, and other debris will be cleaned off of the pipe 504 before the pipe crosses the machine, preventing the debris from falling into the machine 500 and needing to be cleaned off.

Figure 6:
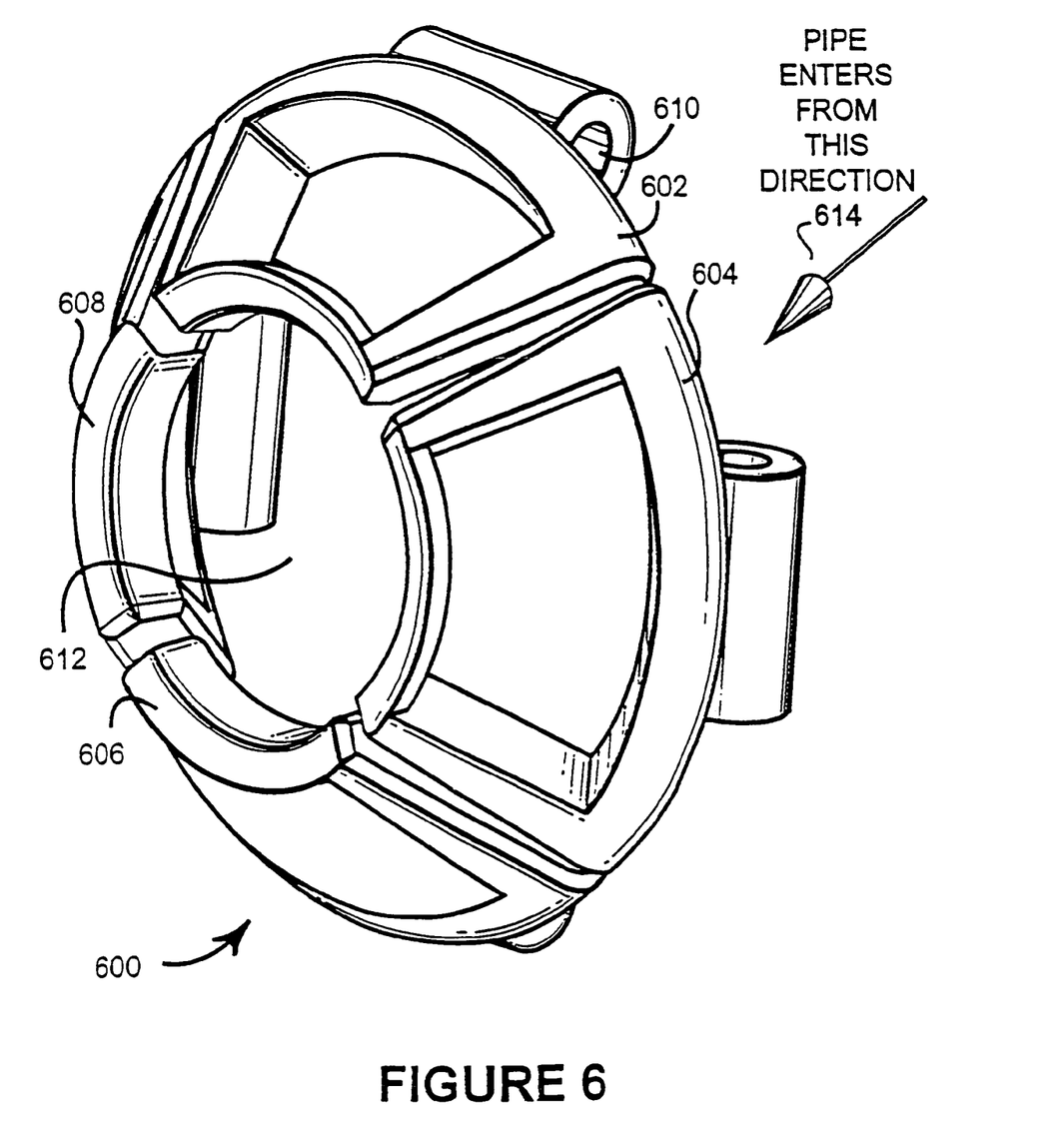
FIG. 6 illustrates a perspective view of an embodiment of the present invention comprised of four flaps.

FIG. 6 illustrates an embodiment 600 of a pipe cleaner that is comprised of four movable flaps, 602, 604, 606, and 608. The flaps are mounted to a framework that is not shown for clarity. The flap 602 rotates about the axis defined by hole 610 and may be mounted to the framework by a bolt. The four flaps 602, 604, 606, and 608 are predispositioned to move inwards by a spring force that is not shown for clarity. The embodiment 600 functions by inserting a pipe into the opening 612 in the direction of arrow 614. As the pipe enters the embodiment 600, one or more of the flaps 602, 604, 606, and 608 may move outward to accommodate the pipe. The pipe may be offset from the center axis of the cleaner, but the cleaner may still function adequately.

Figure 7:
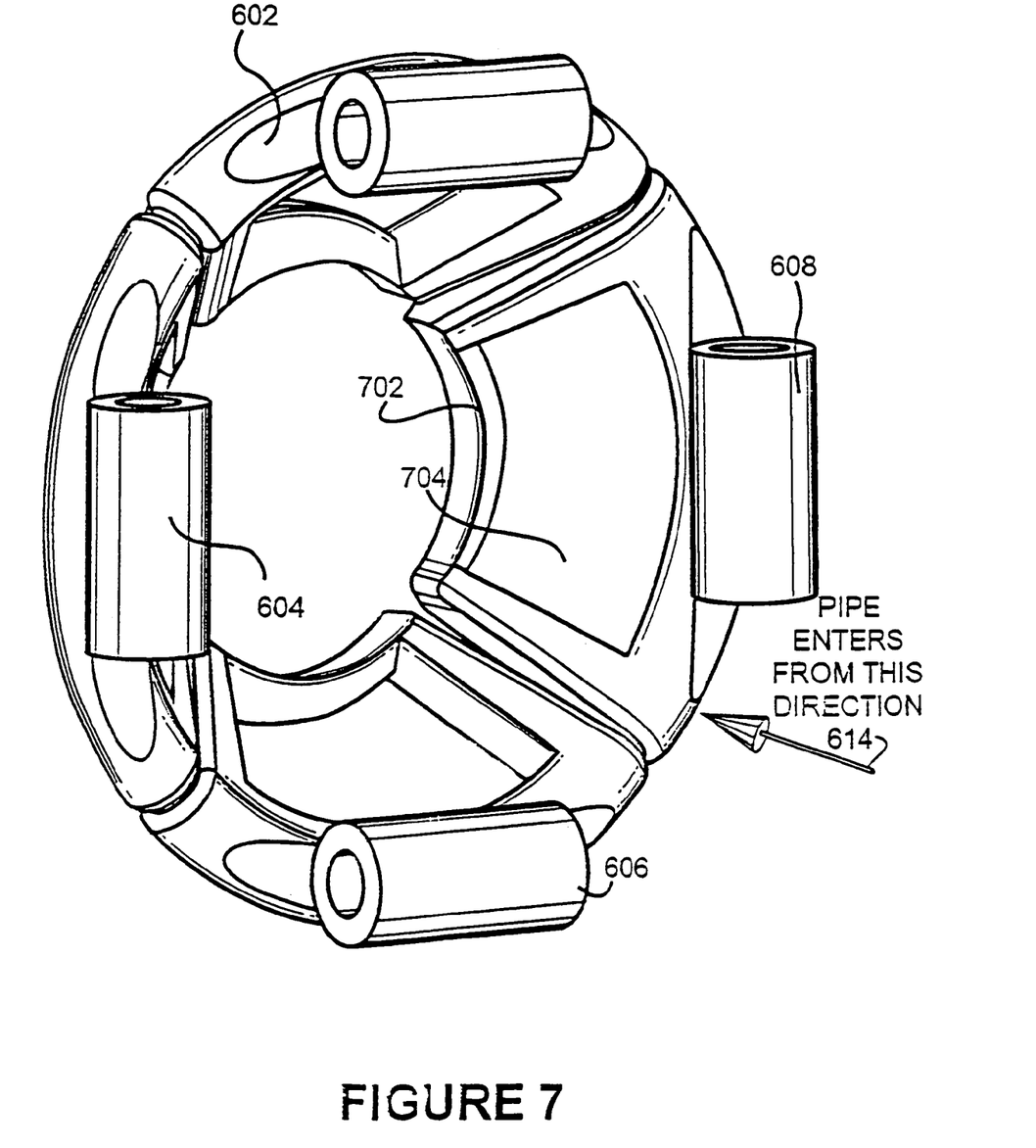
FIG. 7 illustrates a different perspective view of the embodiment of FIG. 6.

FIG. 7 illustrates the embodiment 600 shown from the opposite direction. The flaps 602, 604, 606, and 608 are shown, as well as the direction of pipe movement 614. The scraping edge 702 of flap 608 is caused to ride along the outer surface of the pipe as it traverses through the embodiment 600. The opening 704 may allow snow, mud, and other debris to fall out of the cleaner 600 after having been removed from the pipe.

It can be understood by those skilled in the art that the present embodiment 600 may have many different variations while still maintaining within the scope and intent of the present invention. For example, the number and configuration of the flaps, the attachment method of the flaps, and other changes as may be desired could be made by those skilled in the arts.

The foregoing description of the invention has been presented for purposes of illustration and description. It is not intended to be exhaustive or to limit the invention to the precise form disclosed, and other modifications and variations may be possible in light of the above teachings. The embodiment was chosen and described in order to best explain the principles of the invention and its practical application to thereby enable others skilled in the art to best utilize the invention in various embodiments and various modifications as are suited to the particular use contemplated. It is intended that the appended claims be construed to include other alternative embodiments of the invention except insofar as limited by the prior art.

I claim:

1. A pipe fusion machine for fusing sections of pipe to form a pipeline, comprising:
   (a) a fusing mechanism; and
   (b) a cleaning mechanism for cleaning debris from the external surface of the sections of pipe prior to fusion of the same, said cleaning mechanism comprising:
   a first discus plate having, with respect to said cleaning mechanism, an interior surface,
   a second discus plate having, with respect to said cleaning mechanism, an interior surface,
   a flexible discus wiper having planar surfaces, wherein the interior surfaces of said first and second discus plates and the planar surfaces of said flexible discus wiper are in a parallel configuration, and
   a plurality of independent spacers removably affixed to the interior surface of said first discus plate and the interior surface of said second discus plate, said spacers connecting and separating said discus plates, and being sized and positioned to allow said flexible discus wiper to be held between said interior surfaces of said discus plates.

2. The pipe fusion machine of claim 1, wherein at least one of said spacers is removably affixed to said discus plates so that, when removed from said discus plates, said flexible discus wiper may be removed from between said discus plates.

3. The pipe fusion machine of claim 1, wherein said flexible discus wiper comprises a disk having an aperture therethrough, the circumference of said aperture being defined by the inside edge of said disk.

4. The pipe fusion machine of claim 3, wherein the pipe sections being fused by the pipe fusion machine have corresponding diameters, and wherein the diameter of the aperture of said flexible discus wiper is slightly less than the corresponding diameters of said pipe sections.

5. A pipe cleaner for use with a pipe fusion machine, comprising:
  (a) a first discus plate having, with respect to said pipe cleaner, an interior surface,
  (b) a second discus plate having, with respect to said pipe cleaner, an interior surface,
  (c) a flexible discus wiper, wherein the interior surface of said first and second discus plates and the planar surfaces of said flexible discus wiper are in a parallel configuration, and
  (d) a plurality of independent spacers removably affixed to the interior surface of said first discus plate and the interior surface of said second discus plate, said spacers connecting and separating said discus plates, and being sized and positioned to allow said flexible discus wiper to be held between said interior surfaces of said discus plates.

6. The pipe cleaner of claim 5, wherein at least one of said spacers is removably affixed to said discus plates so that, when removed from said discus plates, said flexible discus wiper may be removed from between said discus plates.

7. The pipe cleaner of claim 5, wherein said flexible discus wiper comprises a disk having an aperture therethrough, the circumference of said aperture being defined by the inside edge of said disk.

8. The pipe cleaner of claim 7, wherein the pipe sections being fused by the pipe fusion machine have corresponding diameters, and wherein the diameter of the aperture of said flexible discus wiper is slightly less than the corresponding diameters of said pipe sections.

9. An improved method for fusing sections of pipe, whereby the improvement comprises cleaning the sections of pipe prior to the fusion of the same by means of a cleaning mechanism comprising:
  (a) a first discus plate having, with respect to said pipe cleaner, an interior surface,
  (b) a second discus plate having, with respect to said pipe cleaner, an interior surface,
  (c) a flexible discus wiper having planar surfaces, wherein the interior surfaces of said first and second discus plates and the planar surfaces of said flexible discus wiper are in a parallel configuration, and
  (d) a plurality of independent spacers removably affixed to the interior surface of said first discus plate and the interior surface of said second discus plate, said spacers connecting and separating said discus plates, and being sized and positioned to allow said flexible discus wiper to be held between said interior surfaces of said discus plates.

10. The method of claim 9, wherein at least one of said spacers is removably affixed to said discus plates so that, when removed from said discus plates, said flexible discus wiper may be removed from between said discus plates.

11. The method of claim 9, wherein said flexible discus wiper comprises a disk having an aperture therethrough, the circumference of said aperture being defined by the inside edge of said disk.

12. The method of claim 11, wherein the pipe sections being fused by the pipe fusion machine have corresponding diameters, and wherein the diameter of the aperture of said flexible discus wiper is slightly less than the corresponding diameters of said pipe sections.

* * * * *